Nov. 12, 1957   J. J. CHEESMAN   2,812,707
TYING MACHINES FOR PACKAGES AND THE LIKE
Filed May 31, 1951   9 Sheets-Sheet 1

INVENTOR
John J. Cheesman
By Ralph B. Stewart
attorney

Nov. 12, 1957 J. J. CHEESMAN 2,812,707
TYING MACHINES FOR PACKAGES AND THE LIKE
Filed May 31, 1951 9 Sheets-Sheet 3

INVENTOR
John J. Cheesman
By Ralph B. Stewart
attorney

Nov. 12, 1957  J. J. CHEESMAN  2,812,707
TYING MACHINES FOR PACKAGES AND THE LIKE
Filed May 31, 1951  9 Sheets-Sheet 4

Nov. 12, 1957 J. J. CHEESMAN 2,812,707
TYING MACHINES FOR PACKAGES AND THE LIKE
Filed May 31, 1951 9 Sheets-Sheet 5

INVENTOR
John J. Cheesman
By Ralph B. Stewart
attorney

Nov. 12, 1957  J. J. CHEESMAN  2,812,707
TYING MACHINES FOR PACKAGES AND THE LIKE
Filed May 31, 1951  9 Sheets-Sheet 8

INVENTOR
John J. Cheesman
By Ralph B. Stewart
attorney

Nov. 12, 1957  J. J. CHEESMAN  2,812,707
TYING MACHINES FOR PACKAGES AND THE LIKE
Filed May 31, 1951  9 Sheets-Sheet 9

INVENTOR
John J. Cheesman
By Ralph B. Stewart
attorney

United States Patent Office

2,812,707
Patented Nov. 12, 1957

2,812,707

TYING MACHINES FOR PACKAGES AND THE LIKE

John James Cheesman, Gerrard's Cross, England, assignor to Leo M. Harvey, Lawrence A. Harvey, and Homer M. Harvey, trading as Harvlan Company, Los Angeles, Calif.

Application May 31, 1951, Serial No. 229,093

Claims priority, application Great Britain June 6, 1950

17 Claims. (Cl. 100—31)

This invention relates to a binding or tying machine and relates more particularly to a machine for binding bundles, boxes, packages, cartons etc. with wire or other flexible element.

Binding or tying machines are known in which the wire is tensioned from both ends before being tied.

Since the wire is tensioned from both ends, stress is more evenly distributed along the length of wire and is not so much affected by frictional resistance between the wire and the package as it would be if tightened from one end only. A package can thus be tightly tied with a smaller force at each gripper than is required for a single tensioning gripper. Cutting of the corners of the package by excess wire tension is thereby avoided.

In the known tying machines in which the wire is tensioned from both ends the movement of the grippers is simultaneous and similar in amount and speed.

It is an object of the invention to provide a tying machine in which the grippers move consecutively in tensioning the wire loop around the package.

It is a further object of the invention to provide a tying machine in which the grippers move unequal distances in tensioning the wire loop around the package.

To obtain the greatest advantage from the invention the wire is preferably tensioned from both ends by consecutive movement of the grippers through unequal distances. There is then very little tendency for the object to rotate or move bodily while being tied. Steadying or clamping means for the object to be tied are then unnecessary. This is a considerable advantage when dealing with packages of assorted sizes.

For many purposes it is quite satisfactory to employ a machine which is not fully automatic but in which the training of the wire around the package is done by hand and the tensioning and tying operations only are performed by the wire-tying machine.

It is therefore a further object of the invention to provide an improved wire-tying machine in which the tensioning and tying operations only are performed by the machine and the wire training is done by hand.

It is another object of the invention to provide a wire tying machine in which tension is applied to the wire at each end through resiliently mounted wire gripping means. When a predetermined tension has been reached the mountings of the gripping means yield so that wire breakage and variation in the tension applied to the wire around the package is obviated.

It is yet another object of the invention to provide the grippers of a wire tying machine with sufficient tensioning travel to allow for large and small sized wire loops which will stretch in proportion to their size in reaching the required tension and to deal with lost motion in bringing the wire fully into contact with the package before there is sufficient resistance from the package actually to tension the wire. Provided that the wire is trained fairly closely around each package by the operator uniform binding is ensured.

A still further object of the invention is to provide a wire tying machine in which one of the gripping means moves before the other to tension the wire initially from one end and then hold the wire resiliently under initial tension while the other gripping means moves to apply tension at the other end of the wire and the wire is tied.

Another object of the invention is to provide means for engaging the newly cut end of the wire supply after the tie has been formed and the ends cut off with the first mentioned gripper and for re-threading the tie-forming means.

According to a further feature of the present invention a wire tying machine is provided with wire-tying means comprising a slotted pinion as tie-forming means and wire cutters on each side of the slotted pinion to cut the wire ends after formation of the tie and in which the tie is ejected in a direction along the adjacent surface of the object, wherein the twister pinion after formation of the tie by rotation of the twister pinion through the position of ejection in a direction away from the object and after the wire ends have been cut, continues partial rotation in the same direction beyond the ejection position and then reverses to the ejection position to relieve torque whereby the cut ends of the tie are directed inwardly towards the object. The wire ends are thus tucked in so that their sharp edges are harmless to persons handling the package.

In this specification to avoid confusion the term "tie-forming means" is used to exclude the two wire gripping means whilst the term "tying means" generally denotes the combination of the tie forming means, wire cutting means, gripping means, and associated mechanism. Also, although the use of wire is described and claimed throughout the specification it is to be understood that any other suitable flexible binding material may be substituted providing the components of the machine and particularly the "tie-forming means" are modified to suit such different material; and accordingly the term "wire" in the claims is intended to include any such flexible element.

The invention will be more fully understood from the following detailed description of an embodiment of the invention in a modified form of the fully-automatic machine described in U. S. Patent Number 2,307,219. The machine in its modified form is described as semi-automatic in that the wire which in this embodiment is used as the flexible binding element is wrapped manually around the object to be tied and only the tensioning and tying operations are actually performed by the machine.

The machine will be described with reference to the following drawings in which:

Figure 1 is a fragmentary front elevation of the machine.

Figure 18 is a transverse cross-sectional view showing part of the mechanism of Figure 11 in operation.

The principal elements of the binding or tying machine illustrated are a supporting frame 20, tying means comprising spaced first gripping means 21 and second gripping means 22 for gripping the wire, tie-forming means 23 between the gripping means 21 and 22 operable to twist or form a tie in the wire trained about an object to be tied placed above the tie-forming means 23 on a flat table top or platform 24 supported by the frame 20, means 25 for separating the wire ends from the wire loop trained around the object during the tie-forming operation for severing the wire following the tie-forming operation and for ejecting the completed tie from the tie-forming means 23, actuating means 26 for shifting and controlling the first gripping means 21 to tension the wire around the object preparatory to the tying operation and to re-thread the tie-forming means 23 at the completion of the tying operation, actuating means 27 for moving the second gripping means to draw the wire wrapped manually about the object to be tied closely around the object and to tension the wire preparatory to the tying operation and various other components and mechanisms, the details and functions of which will be later described. Some of the components and mechanisms of the present machine have already been described in U. S. Patent Number 2,307,219 referred to above and only sufficient description of these components and mechanisms will be included in the present specification as will enable the novel components and mechanisms of the new machine to be properly understood.

The supporting frame 20 is provided to carry the various parts of the machine and is formed and proportioned to act as a table for supporting the objects to be bound. In the construction illustrated the supporting frame 20 includes legs or uprights of which one, 28, is shown in the drawing, horizontal front and rear members of which one, 29, is shown in the drawing and horizontal side members of which one, 30, is shown in the drawing extending between and connecting the legs 28 and supporting the table top or platform 24. The legs or uprights 28 and the horizontal members 29 and 30 may be formed of angle iron. The table top or platform 24 is preferably made of sheet steel and divided into sections which can be removed for easy access to the mechanisms of the machine. In the drawings only sufficient of the frame 20 is shown to enable its general form to be understood and to show the means of mounting the various mechanisms composing the machine. It is to be understood that the supporting frame 20 may be of any suitable construction and design.

It has already been explained that in the present machine the wire is to be entrained by hand around the object to be tied, the wire entraining track bobbin and operating mechanism of U. S. Patent Number 2,307,219 is, therefore, not fitted and all the other mechanism for the machine is housed under the flat table top or platform 24. The tying means is formed by two main groups of mechanisms both of which are driven from a common power source. The first group, which is similar to the corresponding parts of the machine of U. S. Patent Number 2,307,219, comprises the mechanisms for timing and operating the first gripping means 21, the tie-forming means 23, the separating, severing and ejecting means 25; it also includes the wire retainer 31 and the means for timing and operating it. The wire retainer 31 corresponds in some respects to the second gripping means of U. S. Patent Number 2,307,219 but in the present machine merely prevents the wire falling out while permitting it to move axially.

The second group of mechanisms includes the second gripping means 22, the actuating means 27 for controlling the movement of the second gripping means 22, the detent mechanism 32 for retaining the actuating mechanism in the wire tensioning position and the clutch operating mechanism 33 for initiating the operation of the first group of mechanisms. The first group of mechanisms is put into operation by the operator by means of the hand control 34.

Figure 10:
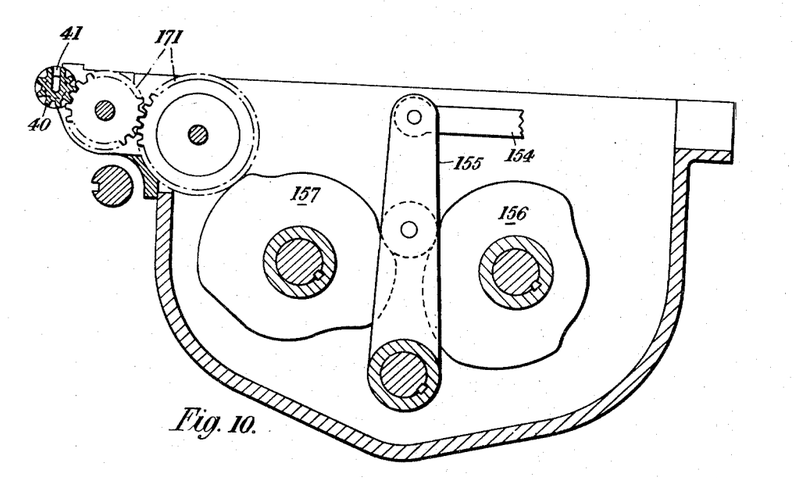

A motor, not shown, drives both groups of mechanisms through a pulley 35 and driving shaft 36, the first group being driven through a worm wheel 37 and a single revolution clutch 38 and the second group by a single revolution clutch 39 mounted directly on the end of the driving shaft 36. In the normal at rest position of the machine in which it is ready to tie or bind an object the free end of the wire is held by the first gripping means 21 and the wire from the supply (not shown) is threaded through a slot 41 in the twister pinion forming the principal element of the tie-forming means 23. The slot 41 can be most clearly seen in Figure 10 but in the at rest position of the machine the open end of the slot is downwardly directed.

Figures 1, 16:
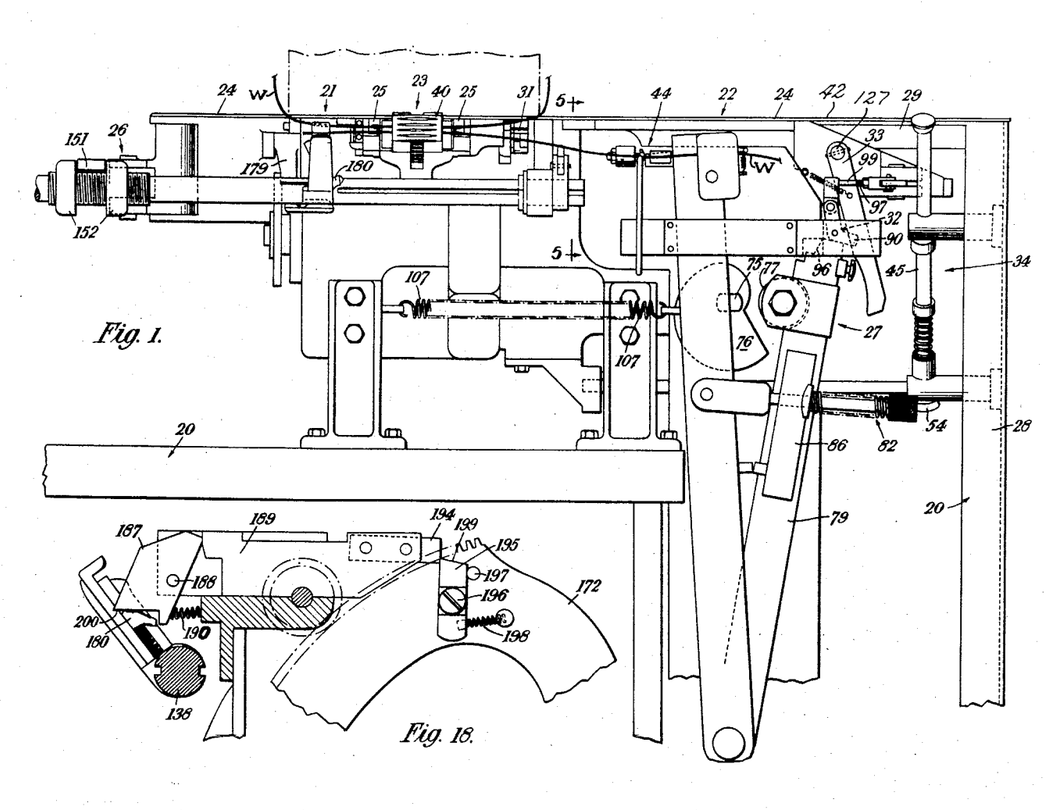

When an object is to be tied it is placed on the platform 24 and the operator passes the supply portion of the wire W in a loop around the object (see Figure 1). Then, holding the supply portion of the wire against the edge 42 of the table top 24, he pulls it up into the slot 41 in the twister pinion and into the bottom opening slot 43 of the second gripping means 22 where it is automatically gripped by jaw release means 44 in a manner to be described later. The two ends of the wire loop around the object to be tied now lie side by side in the slot 41 of the twister pinion 40. The free end of the wire is still held in the first gripping means 21 and the supply end of the wire is gripped in the second gripping means 22.

When the operator starts the machine by manipulating the hand control 34 the gripping means 22 is moved to the right of Figure 1 to take up the slack in the wire loop and to tension the wire around the object being tied from the supply end. The hand control 34 (Figures 1, 3 and 7) comprises a plunger 45 slidably mounted in guides 46 and 47 mounted on one of the legs 28. At the upper end of the plunger 45 a knob 48 for finger operation is fitted. A collar 49 fixed to the plunger 45 acts as an abutment for a compression spring 50, the other end of which has a fixed abutment in the sleeve 51 secured to the lower guide 47. Engagement of the collar 49 with the end surface 52 of the sleeve 51 limits the downward movement of the plunger, upward movement is restricted by the abutment of a collar 53 secured to the plunger 45 against the upper guide 46.

Figures 3, 4:
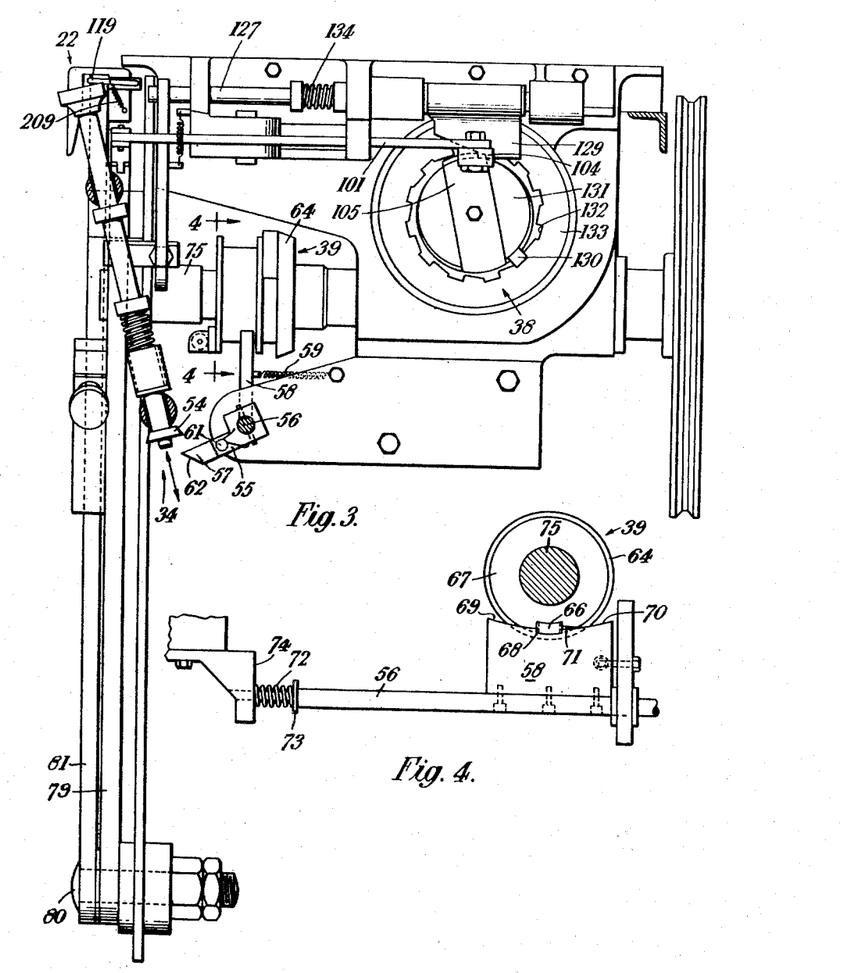
Figure 3 is an end elevation looking towards the right-hand side of Figure 1.
Figure 4 is a fragmentary sectional view on the lines 4—4 in Figure 3.
Figures 3A, 3B, 4A, 4B, 4C, 4D, 7A:
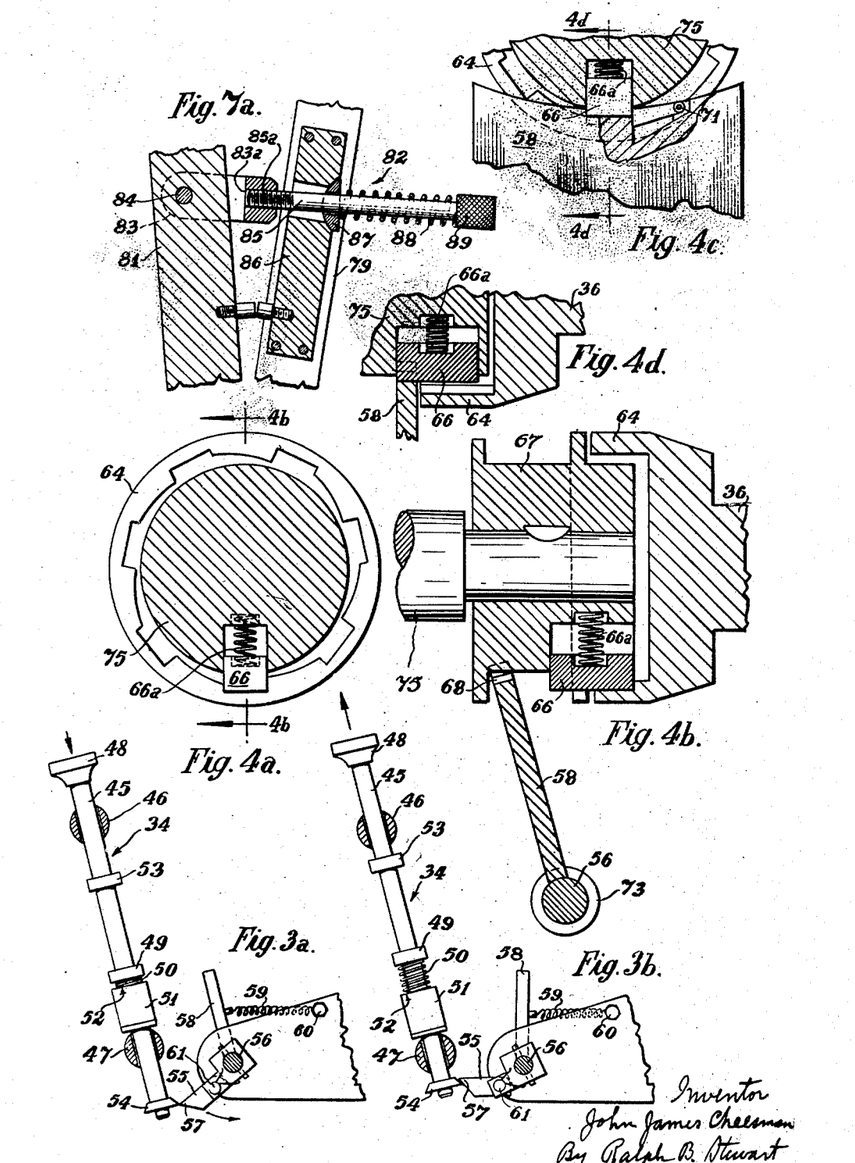
Figures 3a and 3b are similar to part of Figure 3 and illustrate stages in the operation of the operator's control.
Figure 4a shows on an enlarged scale details of the clutch shown in Figure 4 in the driving position.
Figure 4b is a fragmentary section on lines 4b—4b of Figure 4.
Figures 4c and 4d are fragmentary views similar to parts of Figures 4a and 4b but showing the clutch in the disengaged condition.
Figure 7a is a fragmentary sectional elevation of the tension adjusting device of Figure 7.

On the lower end of the plunger 45 a bevelled foot 54 is secured. When the operator presses the knob 48 the foot 54 engages an arm 55, shown in detail in Figure 8. The arm 55 is secured to a clutch operating shaft 56 which is partly rotated in an anti-clockwise direction, as seen from the end visible in Figure 7, as the operator presses the knob 48. Only limited angular movement of the shaft 56 is obtained on pressing the knob 48 since rotation of the arm 55 causes its tip 57 to move out of engagement with the foot 54 (Figure 3a). The shaft 56 carries a clutch operating blade 58, the function of which will shortly be described, and to this blade tension spring 59 is attached. The other end of the tension spring 59 is anchored by a pin 60 to a fixed part of the machine. The spring 59 biases the shaft 56 to rotate in a clockwise direction so that when the bevelled foot 54 disengages the tip 57 of the arm 55 the arm 55 returns immediately towards its initial position. The tip 57 of the arm 55 is hinged about the pin 61 and is arranged so that it will transmit force applied in a downwardly direction to its tip but articulates about the hinge pin 61 when an upward force is applied. Thus when the operator releases the knob 48 the coned edge of the foot 54 engages a bevelled surface 62 on the underside of the tip 57 which yields to allow the foot 54 to pass without rotating the shaft 56 (Figure 3b). A torsion spring 63 (Figure 8) about an extension of the hinge pin 61 returns the tip 57 to the in-line position with the arm 55.

On the end of the drive shaft 36 is mounted the outer or driving element 64 of the single revolution clutch 39. This outer element 64 has inwardly directed notches (Figure 4a) similar to the notches 132 of the outer member 133 of the single revolution clutch 38 (as shown in Figure 3). A key 66 mounted in a key-way in the inner or driven element 67 is urged by a spring 66a radially into engagement with the notches of the driving element 64 but in the at rest position of the machine is withheld from engagement by a step 68 in which the end of the key 66 rests.

When the hand control 34 is operated the blade 58 is deflected from its upright position (as seen in Figures 3 and 4d) towards the left (Figure 4b) and is disengaged from the end of the key 66 which is allowed to drop and engages with the next notch in the driving element 64 to pass (Figures 4a and 4b) and the driving element 64 takes the driven element 67 with it for one complete revolution. Because of the arrangement already described of the foot 54 and tip 57 the blade 58 is only moved to the left momentarily for the key 66 to drop. It then immediately returns towards its original position but cannot return completely to its initial position until the driving member 64 has taken the key 66 above the edge 69 of the blade 58; until this happens the blade 58 rests on the end of the key 66. When the key 66 has been taken out of the way the blade 58 returns to its initial upright position.

The driven member 67 is rotated a full revolution in a clockwise direction (as seen in Figure 4). As the rotation is completed the end of the key 66 engages the ramp surface 70 on the upper edge of the blade 58 which is so shaped that it lifts the key 66 out of engagement with the notch in the driving member 64. Rotation of the driven member 67 is finally arrested by the engagement of the key 66 with the step 68. In reaching its final position against the step 68 the key 66 passes over a detent 71 (Figure 4c) which is depressed by the passage of the key 66 but rises behind it to prevent movement of the driven member 67 in the reverse direction e. g. should there by any tendency for the key 66 to rebound from the step 68. Some freedom of axial movement is permitted the shaft 56 and a compression spring 72 is fitted between a collar 73 on the shaft and an abutment on the bracket 74 mounting one end of the shaft 56. The shock of arresting the driven member 67 is taken by compression of the spring 72 which then returns the shaft 56 and blade 58 axially to their normal at rest position.

Figures 7, 8:
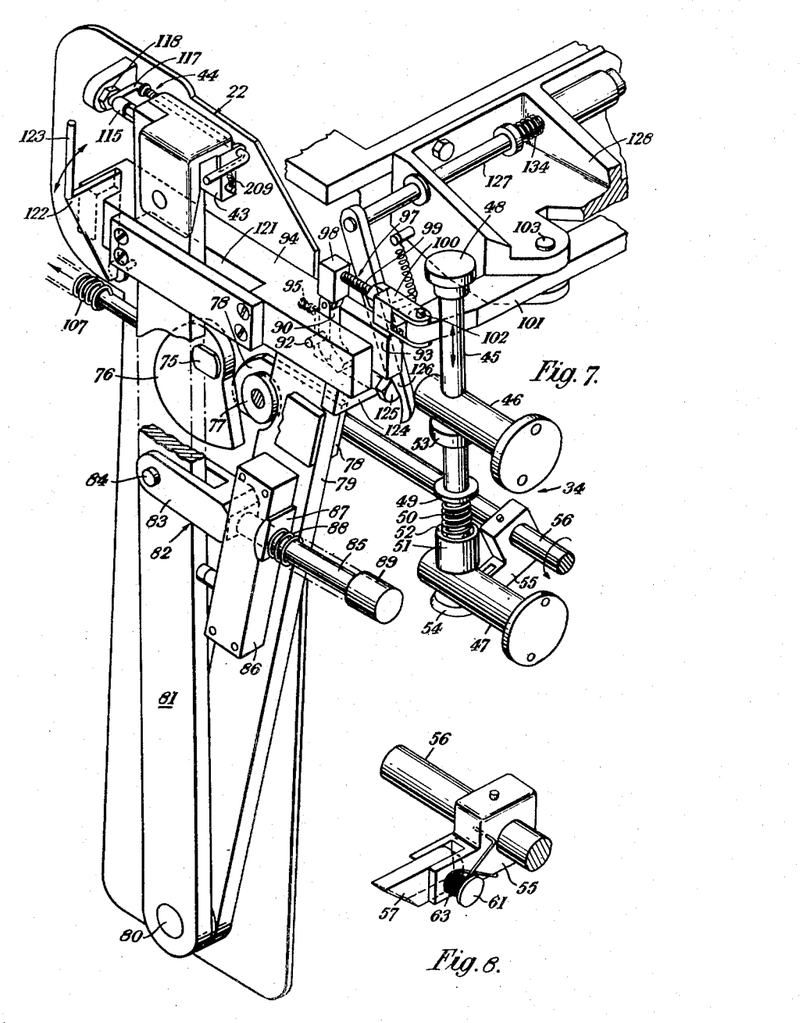
Figure 7 is a fragmentary perspective view of the mechanism shown on the right-hand side of Figure 1.
Figure 8 is a fragmentary perspective view of a pawl which is partially hidden in Figure 7.

The driven member 67 is connected by a shaft 75 to a snail cam 76 (Figures 1 and 7). A roller follower 77 for the snail cam 76 is mounted on a bracket 78 at an intermediate point on a substantially vertically mounted actuating lever 79 pivoted at the lower end by a pivot pin 80 on the frame 20. At the same point a mounting lever 81 for the second gripping means is also pivoted to the frame. This lever carries the second gripping means on its upper end and forms with the actuating lever 79 a V-shaped assembly. The two levers 79 and 81 are connected together by a spring loaded linkage 82 which permits widening of the angle of the V when a predetermined resistance to movement of the lever 81 is reached.

The linkage 82 comprises a fork member 83, the limbs of which straddle and are pivoted to the lever 81 by the pin 84. At the yoke as shown in Figure 7a is a tapped hole 83a which is engaged by a screw-threaded end 85a of an adjusting screw 85 which, to engage the tapped hole, is passed through a large clearance opening in a block 86 secured to the actuating lever 79. The self aligning saddle 87 through which the adjusting screw 85 is also passed engages one end of compression spring 88, the other end of which abuts against the head 89 on the end of the screw. By tightening the screw 85 in the yoke of the fork 83 the loading of the compression spring 88 is increased and, therefore, the tension which is applied to the wire before the linkage 82 will yield is also increased.

When the snail cam 76 is caused to rotate it engages the roller follower 77 and moves the actuating lever 79 towards the right. The snail cam 76 is designed to allow the actuating lever 79 to move to the full extent towards the right and then return slightly towards the left. In this position the actuating lever 79 is retained by the detent mechanism 32. The snail cam 76 completes its rotation out of contact with the roller follower 77 to its initial position.

Figure 2:
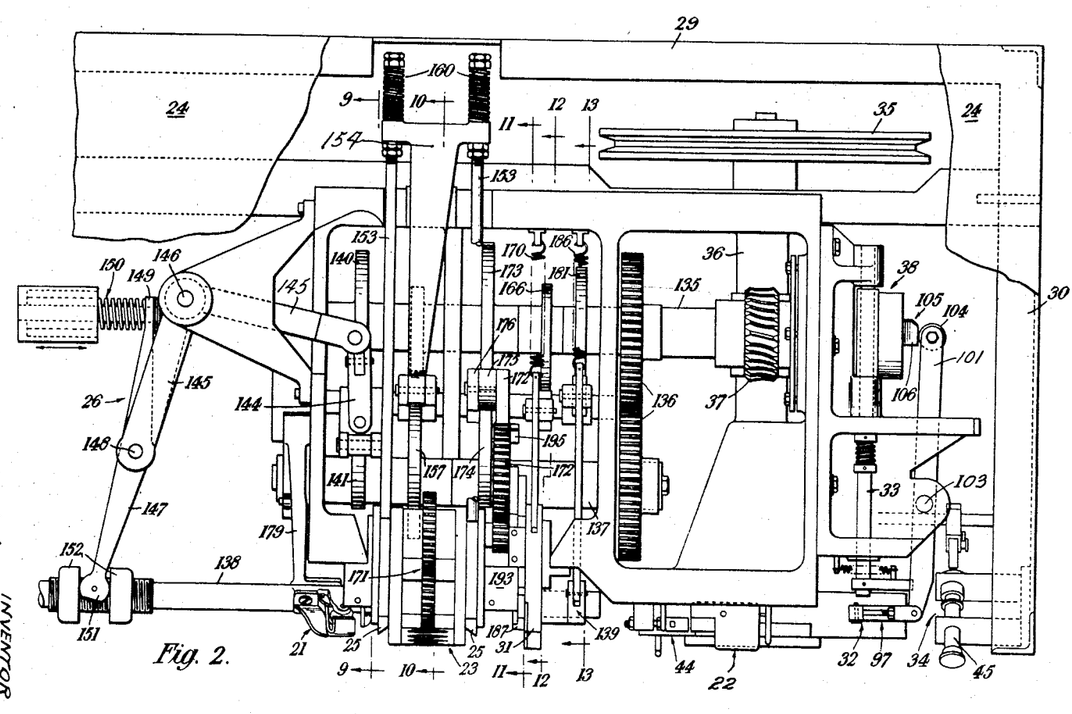
Figure 2 is a fragmentary top plan view.

The detent mechanism 32 comprises a pawl 90 which is pivoted on a pin 92 in a slot 93 in one end of a guide bracket 94. The pawl 90 is urged to rotate in a clockwise direction (as seen in Figure 1) by a spring 95. When the actuating lever 79 is moved to the extreme right hand position the end of the pawl 90 drops into the recess 96 in the top of actuating lever 79. The upper end of the pawl 90 is pivoted to a link 97 adjustable for length and comprising a block 98 in which is secured an adjusting rod 99 which engages a tapped hole in the end of a fork member 100. Between the arms of the fork a resetting lever 101 is entered and pivotally connected at one end to the fork member 100 by a pin 102. The resetting lever 101 is pivoted to a bracket 128 on the frame by a pivot pin 103. The other end of the resetting lever 101 carries a roller 104 which is engageable by the resetting face cam 105 driven through the single revolution clutch 38 for the first group of mechanisms. When the single revolution clutch 38 causes the face cam 105 to rotate, the lobe 106 on the face cam moves the roller 104 and the end of the resetting lever 101 to which it is attached to the right (as seen in Figure 2), the other end of the resetting lever 101 and the link 97 being moved to the left and raises the lower end of the pawl 90 from the recess 96 to the position shown in Figure 1 thus releasing the actuating lever 79 so that the whole actuating means 27 and the mounting lever 81 for the second gripping means moves to the left of Figure 1 under the influence of the tension on the wire held by the second means 22 and the return spring 107. The mounting lever 81 moves to the left in the slot 121 in the guide block 94 and the mounting lever 81 stops when the lever 81 engages the left hand end of the slot 121.

It has already been explained that the second gripping means 22 is operated by jaw release means 44 to grip the wire when the wire is entered in the bottom opening slot 43. When the mounting lever 81 for the second gripping means returns to the left the jaw release means 44 is operated to open the jaws of the second gripping means and release the wire. At the top of the bottom opening slot 43 in the body 108 of the gripping means 22 (Figure 6) is a jaw 109 pivoted for angular movement in a horizontal plane about a pin 110 and having a serrated edge 111 which is urged into contact with the edge 112 of the bottom opening slot 43 by the compression spring 113. The jaw is opened by a plunger 114 slidably mounted in the body 108 and having a head 115 at its outer end.

Figure 6:
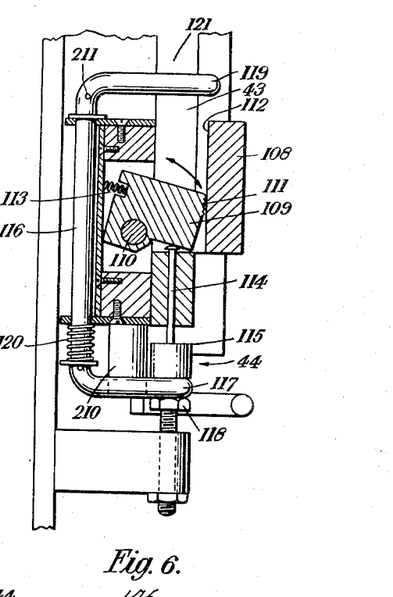
Figure 6 is a plan view of Figure 5 with certain parts thereof shown in section on the lines 6—6 in Figure 5.

A U-shaped release lever 116 is mounted by its central portion at the rear of the gripper body and is permitted rotational movement and some axial movement. One arm 117 of the release lever 116 can be swung into position as a distance piece between the head 115 of the plunger 114 and an adjustable stop 118 which is fixed relative to the frame 20. The other arm 119 of the U-shaped release lever 116 projects across the end of the bottom opening slot 43 (as seen in Figure 7) and is urged towards a slightly downwardly inclined position by a tension spring 209, movement being limited by the engagement of the arm 117 with a stop 210 (Figure 6). A compression spring 120 urges the release lever 116 to the left (as seen in Figure 7).

When the operator brings the wire into the bottom opening slot 43 the wire engages the arm 119 which rotates the release lever 116 and removes the arm 117 from between the head 115 and the stop 118. As soon as the arm 117 is out of engagement with the stop 118 compression spring 120 moves the release lever 116 axially to the left (Figure 7), until it is arrested by the pin 211. The arm 117 can then not drop back into position between the head 115 and the stop 118 but merely rests on the top of the stop 118. The mounting lever 81 is resting against one end of the slot 121 in the guide block 94 so that when the arm 117 is removed from between the head 115 and the stop 118 the mounting lever 81 does not move further to the left but the plunger 114 is released and the spring 113 is allowed to close the jaw 109 and grip the wire between its serrated edge 111 and the surface 112 of the bottom opening slot. When the mounting level 81 is moved to the right during the tensioning of the wire the arm 117 slides off the stop 118 and drops back into position over the end of the head 115 of the plunger 114.

Figure 5:
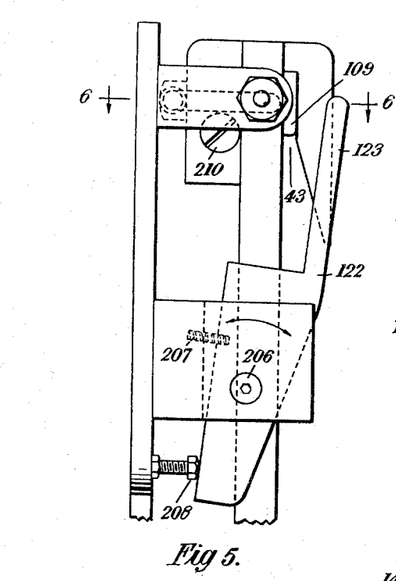
Figure 5 is a fragmentary end elevation of a part of the mechanism shown in Figure 1.

After the tensioning of the wire the actuating means 27 is released by the detent mechanism 32 and the mounting lever 81 returns to the left again. Before the mounting lever 81 reaches the end of the slot 121 the arm 117 engages the stop 118 and the plunger 114 is moved to open the jaw 109 and release the wire. The supply portion of the wire is then held up by a guide 122 which is pivoted for movement in a vertical plane about the pin 206 (Figure 5). The outer part of the guide 122 is formed by a pillar 123 which is normally held in a vertical position by a compression spring 207 forcing the lower end of the guide 122 into engagement with a stop 208. When the supply portion of the wire is being entered in the bottom opening slot 43 the pillar 123 moves inwards to allow the wire to pass and then returns to its upright position.

As the actuating mechanism 27 moving to the right to tension the wire nears the end of its travel it operates the clutch operating mechanism 33 and puts into operation the single revolution clutch 38 which is equivalent to clutch c in Patent 2,307,219, and starts the operations of the first group of mechanisms comprising the mechanisms for turning and operating the first gripping means 21, the tie forming means 23, and separating, severing and ejecting means 25; it also includes the wire retainer 31 and the means for turning and operating it. A bracket 124 secured to the actuating lever 79 carries an adjustable abutment 125 which towards the right hand end of the movement of the actuating lever 79 strikes the end of an arm 126. The arm 126 is mounted on one end of a clutch operating shaft 127 pivoted in a bracket 128 secured to the supporting frame 20. The clutch operating shaft 127 carries a blade 129 (Figure 3) for the single revolution clutch 38 similar to the blade 53 of the single revolution clutch 39. The single revolution clutch 38 is similar to the single revolution clutch 39 and has a radially spring loaded key 130 in the driven member 131 and inwardly directed notches 132 in the driving member 133. In the normal at rest position the blade 129 is vertical and downwardly directed and withholds the key 130 from engagement with the notches 132 of the driving member 133. When abutment 125 moves to the right in Figure 7 and strikes the end of the arm 126 the shaft 127 is rotated in an anti-clockwise direction, displaces the blade 129 and releases the key 130. The key 130 is engaged by the driving member 133 which carries it and the driven member 131 with it for a single revolution at the end of which the key 130 is disengaged by the blade 129. The shaft 127 is permitted some axial movement under restraint of the compression spring 134 in arresting the movement of the driven member 131.

During the single revolution of the clutch 38 the driven member 131 operates the first group of mechanisms previously defined which are generally similar to those described in U. S. Patent Number 2,307,219 and include the tensioning of the wire by gripping means 21, the separating of the loop and the free and supply ends by the separators 25, formation of the tie by the means 23, engagement of the wire by the wire retainer 31, cutting off of the free and supply ends by the separators 25, the re-engagement of the first gripping means 21 with the newly cut end of the wire held by the wire retainer 31 and the re-threading of the tie-forming means 23. Only a brief description of the first group of mechanisms will be given in this specification; fuller details can be obtained from U. S. Patent Number 2,307,219.

Figure 9:
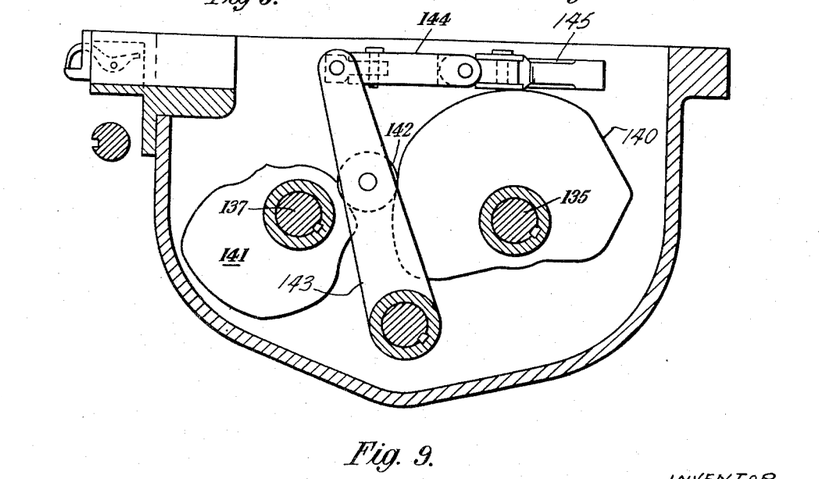
Figures 9, 10, 11, 12 and 13 are transverse cross-sectional views on lines 9—9, 10—10, 11—11, 12—12 and 13—13 indicated in Figure 2.
Figure 14:
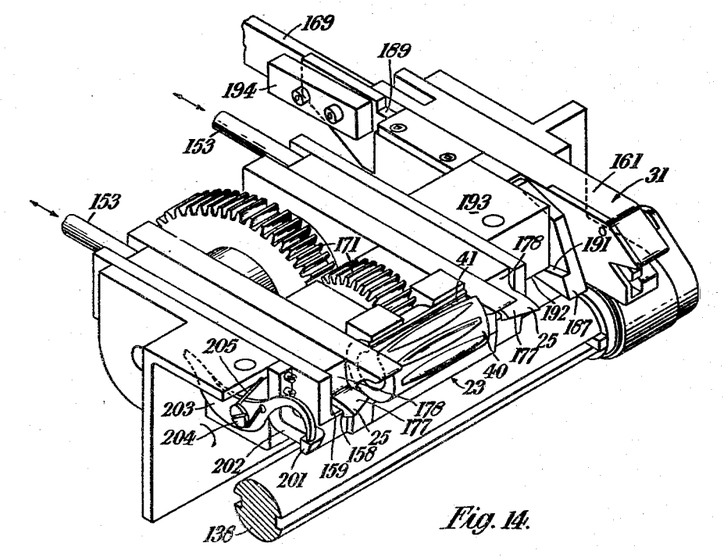
Figure 14 is a fragmentary perspective view of the pinion mechanism shown at the bottom centre of Figure 2, and Figures 15, 16 and 17 are fragmentary perspective views of various elements included in Figure 14.

The driven member 131 of the clutch 38 is mounted on one end of a main cam shaft 135 which through spur gears 136 drives a secondary cam shaft 137. The first gripping means 21 is mounted on a shaft 138 to which an axial sliding movement is imparted by the actuating mechanism 26 and angular movement by the mechanism 139. Two matched cams 140 and 141 (Figure 9) mounted on the cam shafts 135 and 137 engage a roller follower 142 on an arm 143 and through the link 144 operate the actuating mechanism 26 which comprises a bell crank 145 connected at one end to the link 144 and pivoted on the pin 146, and an arm 147 pivoted on the pin 148 at the other end of the bell crank 145. The nearer end 149 of the arm 147 is connected to the bell crank 145 through the resilient link 150 which is adjustable and similar to the link 82 of the actuating mechanism 27 of the second gripping means. The outer end 151 of the arm 147 is engaged between collars 152 on the shaft 138. When the cam shaft 135 commences its revolution the first operation is performed by the cams 140 and 141 which rotate the bell crank 145 in a clockwise direction (as shown in Figure 2) moving the shaft 138 and first gripping means 21 to the left to tension the free end of the wire. When the predetermined tension is reached the resilient link 150 yields and tension is maintained on the wire until the tie has been formed. The separators 25 are next moved forward the left hand one to separate the free end of the wire from the loop around the package, the right-hand one to separate the supply end of the wire from the loop around the package. The separators 25 (as shown in Figure 14) have wedge shaped ends to separate the wire and are slidably moved by rods 153 which extend across the top of the machine (Figure 2) below the platform 24 and are connected to a yoke 154 which is moved by the arm 155 and the matched cams 156 and 157 (shown in Figure 10). Initially the separators 25 are moved by the cams 156 and 157 sufficiently to separate the wire and remain in that position during the tie-forming operation. After the tie has been formed the separators are moved further forward until the free end and supply end of the wire snap behind the rearward cutting edges 158. The separators 25 are then retracted and the wire ends are sheared between the cutting edges 158 and fixed edges 159. During the retracting movement the yoke 154 operates the rods 153 through the compression springs 160 which take up the cutting load. After cutting off of the ends the loop around the object is above the surface 177 of the wedge shaped end of the separators 25. At the appropriate time the separators 25 are again projected forwardly and the face 178 ejects the completed tie from the slot 41 of the twister pinion 40.

Figure 12:
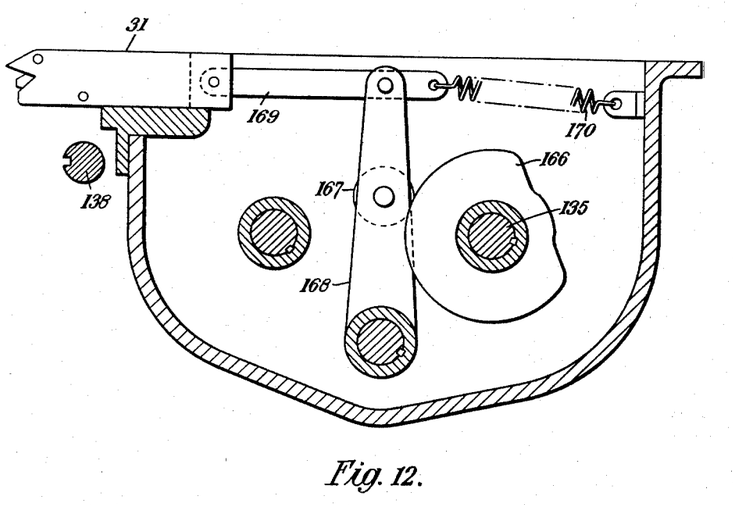
Figures 15, 16, 17:
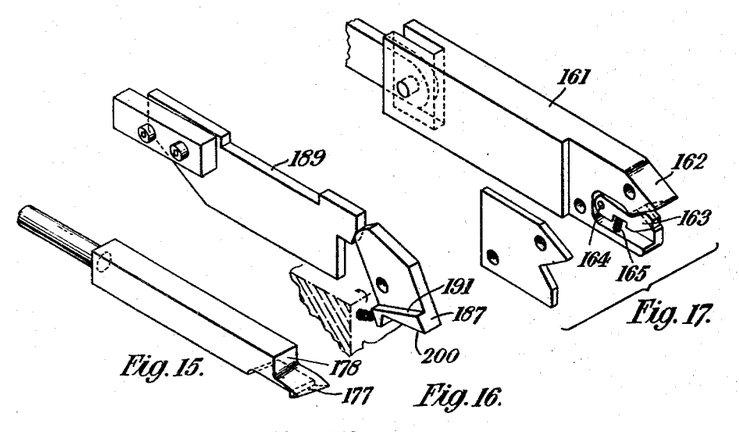

While the wire is in tension the wire retainer 31 is moved forward to engage the supply portion of the wire between the separators 25 and the second gripping means 22. The wire retainer 31 occupies the position of the second gripper of U. S. Patent Number 2,307,219. It is shown in Figure 14 and details of its construction are shown in Figure 17. The body 161 of the wire retainer 31 has a fixed jaw 162 at its forward end and below the fixed jaw 162 a movable jaw 163 pivoted at one end on a pin 164 and urged upwardly into engagement with the fixed jaw 162 by compression spring 165. The ends of the jaws 162 and 163 are chamfered so that as the wire retainer 31 is projected forward the wire engages the chamfered edges, opens the movable jaw 163 and is held between jaws 163 and 162. The wire retainer 31 is moved forward by cam 166 (Figure 12) on the main cam shaft 135 through a roller 167, arm 168 and link 169. The roller 167 is maintained in engagement with the cam 166 by a tension spring 170. At the end of the movement of the first gripping means to rethread the tie-forming means 23 the cam 166 permits the spring 170 to retract the wire retainer 31.

Figure 11:
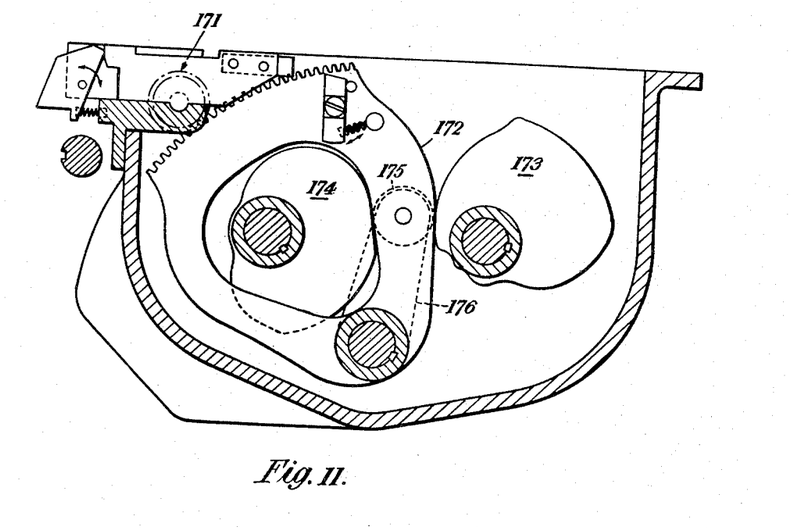

The tie-forming means as already mentioned comprises a twister pinion 40 in which there is a slot 41. The twister pinion 40 is driven through spur gearing 171 by a quadrant 172 (Figure 11) which as in U. S. Patent Number 2,307,219 is moved by matched cams 173 and 174 engaging a roller 175 on an arm 176 connected to the quadrant 172. As previously mentioned the twister pinion 40 in the at rest position of the machine has its slot 41 with its opening downwardly directed. After the wire has been tensioned from both ends and the ends separated from the loop the twister pinion is revolved by the cams 173 and 174 and quadrant 172 in the opposite direction from that described in U. S. Patent Number 2,307,219.

In the present embodiment the slot opening 41 moves rearwardly and upwardly from its initial position i. e. the twister pinion moves in a clockwise direction when viewed from the end seen in Figure 14. It is caused to make several complete revolutions and a half revolution and stops with the slot opening upwards. In this position the wire is severed by the separators 25 as already described. The turning of the pinion 40 then continues for a further half revolution so that its slot opening 41 is once again downwardly directed. It is then reversed a quarter of a revolution to relieve the torque on the wire and stops with its slot opening horizontally outwards, in which position the completed tie is ejected from the slot opening 41 by the separators 25, as already described.

After the severing of the wire the newly cut end of the supply portion is already in the wire retainer 31. The first gripping means 21 is holding the tailing of the free end of the wire. The jaws of the first gripping means 21 are opened to discard the tailing and the first gripping means is moved across the face of the twister pinion 40 to a position adjacent to the wire retainer 31 where it picks up the newly cut end with which it returns to its initial position to rethread the twister pinion 40. The first gripping means 21 is similar to that described in U. S. Patent Number 2,307,219 from which details of its construction can be obtained. After the ejection of the completed tie from the twister pinion 40 an arm 179 is moved to open the jaws of the first gripping means 21 and release the wire tailing. The jaws are held open by a detent 180 (shown in Figures 1 and 18). The mechanism 139 moves the shaft 138 angularly to swing the first gripping means out of axial alignment with the twister pinion 40. The linkage imparting this movement is similar to that of U. S. Patent Number 2,307,219 and includes a single cam 181 on the main cam shaft 135 (Figure 13), a roller follower 182 mounted on an arm 183, a link 184 connecting the upper end of the arm 183 to an arm 185 on the shaft 138 and a return spring 186 for keeping the roller 182 in engagement with the cam 181.

Figure 13:
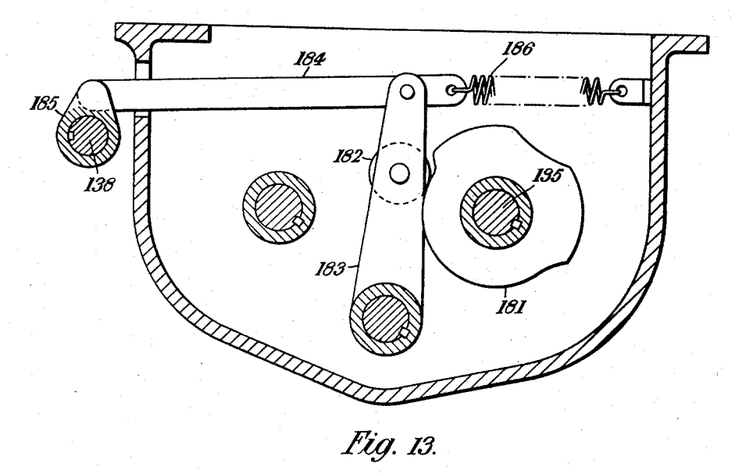

After discarding the tailing the cam 181 causes the shaft 138 to rotate in an anti-clockwise direction (as seen in Figure 13). The actuating mechanism 26 next slides the shaft 138 to the right of Figures 1 and 2 past the twister pinion 40 to the position of the wire retainer 31. The cam 181 then rotates the shaft 138 in a clockwise direction (as seen in Figure 13) to swing the first gripping means 21 back into axial alignment with the twister pinion 40 and adjacent the wire gripping means 31. The detent 180 is now operated to release the jaws of the first gripping means 21 to grip the newly cut end of the wire projecting from the wire retainer 31. The plate lever 187 (Figures 14, 16 and 18) is pivoted near the midpoint of one of its edges on the pin 188 for movement in a vertical plane adjacent to the wire retainer 31. The upper end of the plate lever 187 is held in engagement with a plunger 189 by a compression spring 190 and with a ledge 191 limiting its movement by engagement with the lower edge 192 of the guide block 193 secured to the frame. At the rear end of the plunger an abutment 194 is secured, the end of which is engageable by the trip lever 195 (Figure 18) pivoted by the pin 196 to the quadrant 172 which drives the twister pinion 40. The trip lever 195 is pressed against a stop 197 by the compression spring 198. As the quadrant moves in a clockwise direction (as seen in Figure 18) the sloping edge 199 of the trip lever 195 engages the underside of the abutment 194. The trip lever 195 yields and passes the abutment 194.

When the first gripping means 21 is alongside the wire retainer 31 the detent 180 lies immediately below the horizontal edge 200 on the plate lever 187. The quadrant 172 then begins to move in an anti-clockwise direction (as seen in Figure 18) to return the twister pinion 40 to the initial at rest position of the machine. The trip lever 195 engages the end of the abutment 194, moves the plunger 189 forwards, rotates the plate lever 187 in an anti-clockwise direction (as seen in Figure 18) and moves the detent 180 in a radial direction with respect to the shaft 138 releasing the jaw of the gripping means 21 to grip the newly cut end of the wire. The trip lever 195 slips off the end of the abutment 194 as the quadrant 172 continues its rotation and the spring 190 returns the plate lever 187, plunger 189 and abutment 194 to their initial positions. This clamps the supply end of the wire in gripper 21.

The mechanism 139 now moves the shaft 138 and the first gripping means 21 angularly to pull the wire laterally out of engagement with the wire retainer. The actuating means 26 then moves the shaft 138 and first gripping means 21 bodily to the left (as seen in Figure 2) until the first gripping means 21 is once again in the vertical plane of its initial position.

The mechanism 139 rotates the shaft 138 and swings the first gripping means 21 back into axial alignment with the twister pinion 40. At this stage the twister pinion has returned to its initial at-rest position with the slot opening 41 downwards. When the gripping means 21 swings back into axial alignment with the twister pinion 40 the wire snaps into the slot opening 41, the twister pinion then completes a further three-quarters of a rotation in an anti-clockwise direction (as viewed from the end seen in Figure 14) to the initial at rest position of the machine with the slot opening 41 outwards.

Since the wire supply is not in tension means must be provided to prevent the re-threaded portion of the wire from dropping out of engagement with the slot 41. This is done by the guide 122.

On the left hand side of the twister pinion a further guide 201 is provided which comprises a fixed member 202 against which the end of a swan necked movable member 203 pivoted on a pin 204 is held by the torsion spring 205. When the first gripping means 21 is swung back into its initial at rest position the wire forces the movable member 203 to open so that it is held in the eye of the movable member 203. This part of the wire will become the tailing in the next cycle. The guide 201 holds back the newly-cut end of the tailing and positively removes it from the first gripping means 21 when the first gripping means is opened and is swung outwards at the commencement of the next re-threading operation.

The sequence of the principal events in the complete tying cycle is as follows. In the at rest position the end of the wire supply is already threaded through the twister pinion 40 and is held in the first gripping means 21. The operator trains the wire in a loop around the package or object to be tied by hand and brings the supply end of the loop up into the slot 43, in so doing he also threads the supply end of the loop into the twister pinion 40 so that now both loop ends are laid side by side in the slot 41. As the wire is pulled into the slot 43 of the second gripping means 22 it engages the arm 119 and the jaw 109 grips the wire.

The operator then presses down the hand control 34 which brings the single revolution clutch 39 into operation. The actuating mechanism 27 moves to the right taking with it the second gripping means 22 which first of all draws the loop close around the package or object and then applies tension, adjustably limited by the resilient linkage 82, to the supply end of the wire. Near the end of its movement to the right the actuating mechanism 27 moves the clutch operating mechanism 33 for the clutch 38 and the actuating mechanism 27 is held in its wire tensioning position by the detent mechanism 32. The single revolution clutch 38 engages the drive of the main cam shaft 135 which first of all causes the actuating mechanism 26 to tension the free end of the wire held in the gripping means 21. The separators 25 are then projected forward to separate the ends of the pair of wires lying side by side in the slot of the twister pinion 40 and the wire retainer 31 is projected forward into engagement with the supply side of the wire. The twister pinion forms the tie and stops with the slot opening upwards. The actuating mechanism 27 is then released to remove tension on the supply end of the wire and the second gripping means 22 is disengaged from the wire. The separators 25 then sever the free and supply ends of the tie. The twister pinion 40 applies an overtwist to the wire and reverses a quarter of a turn to the horizontal outward position to which the tie is ejected from the slot of the twister pinion by the separators 25. The first gripping means 21 releases the wire tailing, is swung outwards by the mechanism 139, moved across the face of the twister pinion 40 by the actuating mechanism 26 and swung back into juxtaposition with the wire retainer 31 by the mechanism 139. The plate lever 187 releases the jaw of the first gripping means which grips the newly cut end of the wire. The mechanism 139 swings the wire out of the wire retainer 31, the actuating mechanism 26 returns the first gripping means 21 across the face of the twister pinion 40 and the mechanism 139 swings the first gripping means 21 back into its initial position into axial alignment with the twister pinion 40.

During this return movement of the first gripping means 21 with the newly cut end of the wire the twister pinion 40 has returned to its initial position with its slot opening downwards; as the first gripping means 21 is swung back into axial alignment with the twister pinion 40 the wire is re-threaded in the slot 41. During the return movement of the first gripping means 21 the wire retainer 31 and the separators 25 are retracted to their initial position.

I claim:

1. In a tying machine a first movable wire gripper for holding the free end of a wire, means for supporting the first gripper for bodily movement, a second movable wire gripper for holding the supply portion of the wire, means for supporting the second gripper for bodily movement, means for tensioning the wire including means for moving one of said grippers for tensioning the wire from one end and means actuated independently of said first-mentioned moving means for moving the other of said grippers through a smaller distance than said one gripper for tensioning the wire from the other end, tying means between the first and second grippers for forming a tie in the tensioned wire, and means for severing the tie from said free end held by the first gripper and said supply portion held by said second gripper.

2. In a tying machine a first movable wire gripper for holding the free end of the wire, means for supporting the first gripper for bodily movement, means for supporting an object to be tied, a second movable wire gripper for holding the supply portion of the wire after it has been trained around the object, means for supporting the second gripper for bodily movement, tying means between the first and second grippers for forming a tie in the wire after tensioning, means for tensioning the wire including means for moving the first gripper relative to the tie forming means to tension the wire from the free end thereof and means for moving the second gripper relative to the tie-forming means through a greater distance than the first gripper to tension the wire from the supply end, and means for severing the tie from said free end held by said first gripper and said supply portion held by said second gripper.

3. In a tying machine of the semi-automatic type in which a wire is trained manually about an object to be tied and is tensioned and tied by the machine, a first movable wire gripper for holding the free end of a wire, means for supporting the first gripper for bodily movement, mean for supporting such object, a second movable wire gripper for holding the supply portion of the wire after it has been trained manually about such object, means for supporting the second gripper for bodily movement, means for moving the second gripper to draw the manually looped wire closely about such object and to tension the wire from the supply end, means actuated independently of said gripper moving means for moving the first gripper by a smaller amount than said second gripper to tension the wire from the free end, tying means between the first and second gripping means for forming a tie in the tensioned wire, and means for severing the tie from said free end held by the first gripper and said supply portion held by said second gripper.

4. In a tying machine a first movable wire gripper for holding the free end of a wire, means for supporting the first gripper for bodily movement, a second movable wire gripper for holding the supply portion of the wire, means for supporting the second gripper for bodily movement, means for bodily moving the first gripper to tension the wire, means for bodily moving the second gripper to tension the wire, means for moving one of said grippers before the other to tension the wire initially from one end, means for holding said one gripper resiliently to retain the wire under initial tension, means for moving the other gripper while the wire is held under initial tension and for applying tension at the other end of the wire, tying means between the first and second grippers for forming a tie in the tensioned wire, and means for severing the tie from said free end held by the first gripper and said supply portion held by said second gripper.

5. In a tying machine of the semi-automatic type in which a wire is trained manually about an object to be tied and is tensioned and tied by the machine, a first movable wire gripper for holding the free end of a wire, means for supporting the first gripper for bodily movement, a second movable wire gripper for holding the supply portion of the wire after it has been trained manually about such object, means for supporting the second gripper for bodily movement, means for bodily moving one of said grippers before movement of the other of said grippers in order to draw the manually trained wire closely about said object and to tension the wire initially from one end, means for holding said one gripper resiliently to retain the wire under initial tension, means for bodily moving said other gripper for applying tension to the wire from the other end while the wire is held under initial tension, tying means between the first and second gripper for forming a tie in the tensioned wire, and means for severing the tie from said free end held by the first gripper and said supply portion held by said second gripper.

6. In a tying machine, a first movable gripper for holding the free end of a wire, means for supporting the first gripper for bodily movement, a second movable gripper for holding the supply portion of a wire after it has been trained manually about an object to be tied, means for supporting the second gripper for bodily movement, means for bodily moving the second gripper before movement of the first gripper in order to draw the wire closely about said object to tension the wire initially from the supply end, means for holding the second gripper resiliently under initial tension, means for bodily moving the first gripper and for applying tension to the wire from the free end while the supply end is held resiliently under initial tension by the second gripper, tying means between the first and second grippers for forming a tie in the tensioned wire, and means for severing the tie from said free end held by the first gripper and said supply portion held by the second gripper.

7. In a tying machine, a first movable gripper for holding the free end of a wire, means for supporting the first gripper for bodily movement, a second movable gripper for holding the supply portion of a wire after it has been trained manually about an object to be tied, means for supporting the second gripper for bodily movement, means for bodily moving said first gripper to tension the wire, means for bodily moving said second gripper to tension the wire, tying means between the first and second grippers for forming a tie in the tensioned wire, means for severing the tie from said free end held by the first gripper and said supply portion held by said second gripper, one of said means for bodily moving the grippers including actuating means for bodily moving one of said grippers before the other to draw the wire closely about said object and to tension the wire initially from one end, adjustable resilient link means connecting said actuating means to said last mentioned gripper for adjustably limiting the tension applied to the wire, detent means for holding said actuating means under initial tension until the tie has been formed, and means for disengaging said detent means to release said actuating means after the tie has been formed.

8. In a tying machine according to claim 7 operator's control means for initiating the operation of the actuating means, starting means operated by said actuating means for initiating the bodily movement of said other gripper to tension the wire, and means for disengaging the detent means from the actuating means on completion of the tie-forming operation, said starting means being operated by said actuating means towards the end of the wire tensioning movement of said actuating means.

9. In a tying machine a first movable gripper for holding the free end of a wire, means for supporting the first gripper for bodily movement, a second gripper for holding the supply portion of the wire, means for supporting the second gripper for bodily movement, means for bodily moving the first and second grippers to tension the wire, tying means between the first and second grippers for forming a tie in the tensioned wire, means for severing the tie from said free end held by said first gripper and from said supply portion held by said second gripper, wire retaining means between said tie-forming means and said second gripper for engaging the tensioned supply portion of the wire before severing and for retaining the newly cut end of said supply portion, and means for relieving the tension on the supply portion of the wire after the tie has been formed by said tie-forming means and before the wire is cut by said severing means, the wire thereafter being retained by said wire retaining means.

10. In a tying machine a first movable gripper for holding the free end of a wire, means for supporting the first gripper for bodily movement, a second gripper for holding the supply portion of the wire, means for supporting the second gripper for bodily movement, means for bodily moving the first and second grippers to tension the wire, tying means between the first and second grippers for forming a tie in the tensioned wire, means for severing the tie from said free end held by said first gripper and from said supply portion held by said second gripper, wire retaining means between said tie-forming means and said second gripper for engaging the tensioned supply portion of the wire before severing and for retaining the newly cut end of said supply portion, and means for re-threading the tying means including means for bodily moving the first gripper from a normal position adjacent one end of the tie-forming means into a position adjacent the wire retaining means after severing of the wire to receive therefrom the newly cut end of the wire and for bodily returning said first gripper to its normal position with the newly cut end of the wire to re-thread the tie-forming means.

11. In a tying machine according to claim 10 means for causing said first gripper to grip the newly cut end of the wire when said first gripper is in wire receiving relation with respect to said wire retaining means preparatory to re-threading the tie-forming means and means for bodily moving said first gripper to pull the newly cut end out of engagement with the wire retaining means.

12. In a tying machine according to claim 11 driving means for operating the tie-forming means to form a tie and for returning the tie-forming means to an initial position in which it is rethreaded preparatory to forming a further tie, the means for causing said first gripper to grip the newly cut end of the wire being operated by said driving means during the return movement of the tie-forming means to the re-threading position.

13. In a tying machine, a first movable gripper for holding the free end of a wire, means for supporting the first gripper for bodily movement, a second movable gripper for holding the supply portion of the wire, means for supporting the said second gripper for bodily movement, means for bodily moving both the first and second grippers and for tensioning the wire by the first and second grippers, tying means between the first and second grippers for forming a tie in the tensioned wire, severing means for cutting the tie free from said free end held by the first gripper and from said supply portion held by the second gripper, means constituted by said first gripper for re-threading the newly cut end of the supply portion through the tie-forming means, and means on at least one side of the tie-forming means for keeping the untensioned wire in engagement with the tie-forming means after re-threading and until a loop of wire is placed around a package.

14. In a a tying machine a first movable gripper for holding the free end of a wire, means for supporting the first gripper for bodily movement, a second movable gripper for holding the supply portion of a wire after it has been trained manually about an object to be tied, spring means for closing the second gripper, means for holding the second gripper in the open or wire receiving position against the action of the spring means while the machine is in its normal at rest position, means actuated by the wire on insertion of the supply portion of the wire into the second gripper for releasing the second gripper to grip the wire, means for supporting the second gripper, means for drawing the wire closely about said object by movement of one of said grippers, means operative after said drawing means for tensioning the wire from both ends by moving the other of said grippers, tying means between the first and second grippers for forming a tie in the tensioned wire, and means for severing the tie from said free end held by the first gripper and said supply portion held by said second gripper.

15. In a tying machine connected to a wire supply, tie-forming means, a first movable gripper for holding the free end of the wire, means for supporting the first gripper for bodily movement, a second movable gripper for receiving the supply end of the wire after the wire has been trained by hand to form a loop around the object to be tied, means for moving the second gripper to draw the wire loop close around the object and to apply tension to the supply end, means for adjustably limiting the tension applied to the supply end of the wire and means for retaining the second gripper in the tension applying position during the further tensioning and tie-forming operation, means for moving the first gripper while the second gripper is held to tension the wire from its free end, means for releasing the means for retaining the second gripper in the tension applying position to remove tension from the wire, means for cutting off the wire ends on each side of the completed tie, means for ejecting the completed tie from the wire tying means, means for engaging the first gripper with the newly cut end of the wire and means for rethreading the tie-forming means.

16. In a tying machine a first movable wire gripper for holding the free end of a wire, means for supporting the first gripper for bodily movement, a second movable wire gripper for holding the supply portion of the wire, means for supporting the second gripper for bodily movement, means for bodily moving one of said grippers before, and through a greater distance than, the other for drawing the wire closely about said object and for applying initial tension to the loop from one end, means for resiliently holding said one gripper to retain the wire under initial tension means for bodily moving the other of said grippers and for applying tension at the other end of the wire, tying means between the first and second grippers for forming a tie in the tensioned wire, and means for severing the tie from said free end held by the first gripper and said supply portion held by said second gripper.

17. In a tying machine a first movable gripper for holding the free end of a wire, means for supporting the first gripper for bodily movement, a second movable gripper for holding the supply portion of a wire after it has been trained manually about an object to be tied, spring means for closing the second gripper, plunger means on said second gripper for opening said second gripper against the action of the spring means, a stop, a displaceable distance piece normally against the stop and engageable by said plunger means, further spring means urging said second gripper bodily towards the stop and said plunger against said distance piece for holding said second gripper open by displacing said plunger means while the machine is in its normal at rest position, and means actuated by the wire on insertion of the supply portion of the wire into the second gripper for causing the second gripper to close and grip the wire by dislodging the distance piece.

References Cited in the file of this patent

UNITED STATES PATENTS

| | | |
|---|---|---|
| 2,042,843 | Harvey | June 2, 1936 |
| 2,134,187 | Harvey | Oct. 25, 1938 |
| 2,307,219 | Harvey | Jan. 5, 1943 |
| 2,339,395 | Harvey | Jan. 18, 1944 |
| 2,512,754 | Tuft | June 27, 1950 |
| 2,707,429 | Leslie et al. | May 3, 1955 |